US Patent [19] 3,903,141
Just et al. [45] Sept. 2, 1975

[54] ADAMANTANE CARBOXYLIC ACID SALTS OF BIGUANIDES

[75] Inventors: Hellmut Just; Günter Herzig, both of Annedore Wehl; Irmgard Roske, Berlin, all of Germany

[73] Assignee: VEB Berlin-Chemie, Berlin, Germany

[22] Filed: May 29, 1973

[21] Appl. No.: 364,465

[30] Foreign Application Priority Data
May 29, 1972  Germany............................. 163246

[52] U.S. Cl.. 260/501.14; 260/243 B; 260/247.2 R; 260/268 PC; 260/293.56; 424/317
[51] Int. Cl........................................... C07c 129/16
[58] Field of Search................................ 260/501.14

[56] References Cited
UNITED STATES PATENTS
3,270,054   8/1966   Gagneux et al................ 260/501.14

FOREIGN PATENTS OR APPLICATIONS
618,613    2/1949    United Kingdom............ 260/501.14
871,182    6/1961    United Kingdom............ 260/501.14
2,037,002  12/1970   France........................... 260/501.14

Primary Examiner—Lorraine A. Weinberger
Assistant Examiner—Paul J. Killos
Attorney, Agent, or Firm—Nolte and Nolte

[57] ABSTRACT
A salt of a biguanide of the formula:

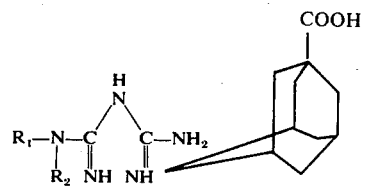

wherein $R_1$ is selected from the group consisting of alkyl and aralkyl and $R_2$ is selected from the group consisting of hydrogen and alkyl or $R_1$ and $R_2$ taken together form a radical selected from the group consisting of carbocyclic radicals and heterocyclic radicals; a process for preparing a salt of a biguanide of the above formula which comprises contacting a biguanide of the formula:

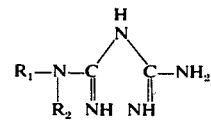

wherein $R_1$ is selected from the group consisting of alkyl and aralkyl, $R_2$ is selected from the group consisting of hydrogen and alkyl or $R_1$ and $R_2$ taken together form a radical selected from the group consisting of carbocyclic radicals and heterocyclic radicals and 1-adamantane carboxylic acid, preferably in an organic solvent, and recovering the salt of the biguanide having the first formula set forth above.

8 Claims, 1 Drawing Figure

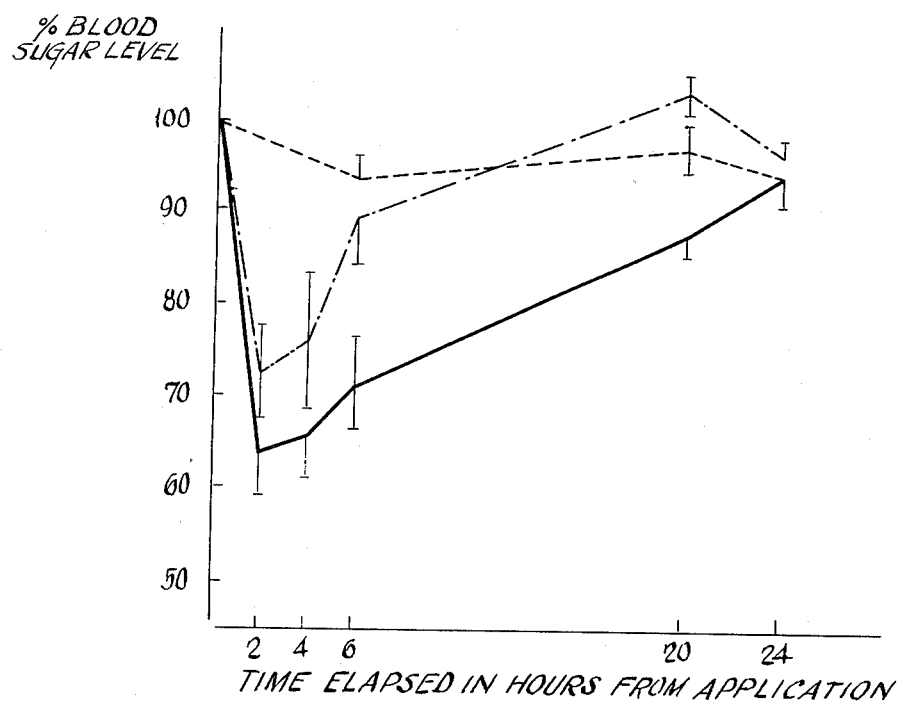

ADAMANTANE CARBOXYLIC ACID SALTS OF BIGUANIDES

This invention relates to new salts of biguanides and to processes for their production. More particularly, this invention relates to a process for preparing long lasting biguanide derivatives which are useful as hypoglycemics in therapy. The present invention is particularly directed to the preparation of biguanide adamantoates by reaction of biguanides with 1-adamantane carboxylic acid.

Biguanides have long been known as pharmaceutical substances. They are used as such in the form of salts such as the hydrochloride, the sulfate, the phosphate or the citrate.

Known especially are the N', N'-anhydro-bis-(2-hydroxy -ethyl) biguanide. This compound finds use as a virustatic. Additionally, these biguanide substances are useful in lowering the sugar content in blood. Especially useful are butyl biguanide and β-phenylethyl biguanide. These latter two compounds, therefore, are particularly useful as hypoglycemics. In U.S. Pat. No. 3,270,036 and Japanese Pat. No. 4,583 (67) there are described further adamantyl biguanides which likewise can be used as hypoglycemics and which are distinguished by a longer lasting effect.

The known biguanides, especially butyl biguanide β-phenylethyl biguanide, are known pharmaceutical substances employed in therapy. However, they suffer from a particular disadvantage in their use, i.e., they have a relatively short duration in respect of their activity and therefore it is required to administer them to the patient frequently. Hence it has become desirable to provide a hypoglycemic which is characterized by an improved duration of activity.

It is, therefore, an object of this invention to provide biguanide in a form which is long lasting.

The objects of the present invention are satisfied by a biguanide salt having the following formula:

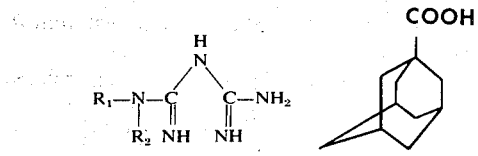

wherein $R_1$ is selected from the group consisting of alkyl and aralkyl, $R_2$ is selected from the group consisting of hydrogen and alkyl, or $R_1$ and $R_2$ are taken together and form a radical selected from the group consisting of carbocyclic radicals and heterocyclic radicals.

In the above formula, $R_1$ can be alkyl or aralkyl. Preferably, $R_1$, when an alkyl group, has a carbon length between 1 and 8 carbon atoms and, most preferably, 1 to 4 carbon atoms. When $R_1$ is an aralkyl group, the alkyl portion preferably has between 1 and 8 carbon atoms and the aryl portion preferably is a benzene nucleus. However, it should be understood that the aryl portion of the aralkyl derivative can be $C_{12}$ to $C_{18}$. Additionally, each of the above referred to alkyl portions can be substituted or unsubstituted. Similarly, the aryl portion of an aralkyl group can be unsubstituted or substituted. When any radical or portion of a radical is substituted, it can be substituted by the following moieties: halogen, methoxy, ethoxy, methylenedioxy, trifluormethyl, nitro.

With respect to the above defined biguanide salt, $R_2$ is hydrogen or alkyl. When alkyl it can be substituted or unsubstituted. When $R_2$ is alkyl it preferably has between 1 and 8 carbon atoms in the chain. When $R_2$ is a substituted alkyl group, it can be substituted by the following moieties: methoxy, ethoxy, dimethylamino, diethylamino. When $R_1$ and $R_2$ are taken together to form a cyclic radical the cyclic radical can be carbocyclic or heterocyclic. In either case it generally has between 5 and 8 elements in the ring. If heterocyclic it can have nitrogen, oxygen or sulfur in the rings. Either type of cyclic radicals can be substituted by the above moieties.

The biguanide salts of the present invention are prepared by contacting a biguanide of the formula:

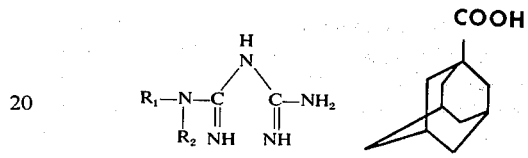

wherein $R_1$ and $R_2$ have been previously described significance with 1-adamantane carboxylic acid.

The reaction of the biguanide with 1-adamantane carboxylic acid desirably takes place in an organic solvent such as an alkanol. It additionally can take place in water. Suitable alkanols include especially $C_1$—$C_4$ alkanol, especially ethanol. Additionally, mixtures of organic solvents and water can be employed. Additional solvents which are useful for the reaction include the following: acetone, tetrahydrofuran, dioxane alone or in admixture with water.

The reaction is carried out at a temperature between 10° and 80°C, preferably between 20° and 50°C. Preferably, the reaction is carried out at atmospheric pressure. The reaction is usually conducted for a period of time between 1 and 30 minutes. Usually, however, the reaction is carried out between 1 and 5 minutes. Generally, a stoichiometric amount of each reactant is employed.

The reaction product can be recovered employing known recovery procedures. For instance, the novel biguanide salt as so synthesized can be recovered from the reaction mixture by concentrating the solution under vacuum, viz., cooling the solution and applying a vacuum thereto, whereafter sodium chloride is washed from the product with water and the product is dried.

After the same is recovered, it can be isolated and purified by reprecipitation or recrystallization. The solvent employed as the reaction medium can also be employed in the reprecipitation and/or recrystallation step. Generally speaking, the reaction product is recovered in yields between 80 and 99%. For the recrystallation step, it is preferred to employ a mixture of ethanol and water as the recrystallizing medium. Generally speaking, the ethanol/water mixture can have an ethanol to water volume ratio of between 9:1 to 1:1.

Another suitable recrystallization medium is ethyl acetate.

The drawing is a diagram showing the effect of blood sugar lowering as a function of time after the administration of the substances identified in the drawing. The FIGURE shows, specifically, the lowering of the blood sugar level by butyl biguanide hydrochloride and that of butyl biguanide-(1)-adamantoate. The effect is measured against the time after administration of the blood sugar lowering agent. The test was conducted on guinea pigs and rats. The specific data in the diagram is in respect of guinea pigs. In that data the dosages are for the butyl biguanidine hydrochloride 25 mg. of the compound per kg. of body weight of the test animal and for the butyl biguanidine-(1)-adamantoate an equimolar amount based on butyl biguanidine per kg. of body weight of the test animal. Twenty test animals were used for each of the two compounds and 10 for the control.

In order to illustrate the compounds of the present invention and the manner in which they are prepared the following examples are set forth:

EXAMPLE 1

50.0 g. (0.26 mole) of n-butyl biguanide · HCl were dissolved hot with 47.1 g. (0.26 mole) of 1-adamantane carboxylic acid and 10.4 g. (0.26 mole) of analytically pure sodium hydroxide in 1000 ml. ethanol/water 1:1. After complete dissolution the solvent was evaporated under vacuum and the residue was suspended with 200 ml. water and suction filtered. Yield: 85.1 g. (97.6% of the theory). M.p. 156° to 157°C. The salt was purified by recrystallization from ethanol/water in a volume ratio of 9:1.

EXAMPLE 2

Analogously to Example 1, 20.7 g. (0.1 mole) of N,-N'-anhydro-bis-(2-hydroxyethyl)-biguanide · HCl, 18.0 g. (0.1 mole) of 1-adamantane carboxylic acid, and 4.0 g. (0.1 mole) of sodium hydroxide, analytically pure, were reacted in 100 ml. ethanol/water in a volume ratio of 1:1. Yield: 31.0 g. (88.3% of the theory). M.p. 215° to 217°C.

EXAMPLE 3

7.46 g. (0.0414 mole) of 1-adamantane carboxylic acid were dissolved in 300 ml. water and 1.66 g. (0.0414 mole) NaOH. To this was added a solution of 10.0 g. (0.0414 mole) of -phenylethyl biguanide · HCl in 100 ml. water. The adamantoate precipitated first as an oil, which was caused to crystallize by rubbing with a glass rod. The suction-filtered and dried salt was recrystallized from ethyl acetate. Yield: 12.0 g. (81.0% of the theory). M.p. 95° to 97°C.

EXAMPLE 4

18 g. (0.1 mole) of 1-adamantane carboxylic acid were dissolved in 140 ml. water and 4 g. (0.1 mole) NaOH. To this was added a solution of 16.5 g. (0.1 mole) N,N-dimethylbiguanide in 20 ml. water. By the application of vacuum, the solution was reduced to 50 ml. The salt which crystallized out was separated and dried and recrystallized from a solution thereof in aqueous ethanol of 96% concentration. Yield: 27.9 g. (81% of theoretical). M.p. 218°–220°C.

The biguanide adamantoate salts of the present invention are seen to have a longer lasting effect in the lowering of blood sugar than the biguanides of the prior art. Pharmacological testing of the biguanides as well as of their corresponding adamantoates, has shown that the biguanide adamantoates have a definite prolongation for the duration of their activity with respect to the lowering of blood sugar when compared to pure biguanides. Such is vividly demonstrated by the data set forth in the diagram depicting the activity level of the agents as the function of time. The data set forth in this figure is in respect of tests conducted on guinea pigs.

Generally speaking, biguanide adamantoates are administered in the following form: tablets, dragees, capsules, and the like.

What is claimed is:

1. A biguanide salt of the formula:

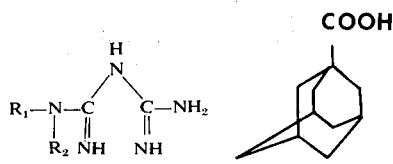

wherein $R_1$ is selected from the group consisting of alkyl of $C_1$ to $C_8$ carbon atoms and aralkyl, $R_2$ is selected from the group consisting of hydrogen and alkyl of $C_1$ to $C_8$ carbon atoms.

2. A biguanide salt according to claim 1, wherein $R_1$ is an alkyl of $C_1$ to $C_8$ carbon atoms.

3. A biguanide salt according to claim 1, wherein $R_2$ is an alkyl radical of $C_1$ to $C_8$ carbon atoms.

4. A biguanide salt according to claim 2, wherein $R_1$ is an unsubstituted alkyl radical.

5. A biguanide salt according to claim 3, wherein $R_2$ is an unsubstituted alkyl radical.

6. As a biguanide salt of claim 1, butylbiguanide-(1)-adamantoate.

7. As a biguanide salt of claim 1, β-phenylethylbiguanide-(1)adamantoate.

8. As a biguanide salt of claim 1, N,N-dimethylbiguanide-(1)-adamantoate.

* * * * *